C. G. COOKE.
FLAX MACHINE.
APPLICATION FILED DEC. 13, 1906.

1,134,671.

Patented Apr. 6, 1915.
8 SHEETS—SHEET 8.

UNITED STATES PATENT OFFICE.

CLAYTON G. COOKE, OF NEW HAVEN, CONNECTICUT, ASSIGNOR, BY MESNE ASSIGNMENTS, TO AMERICAN LINEN FIBRE COMPANY, A CORPORATION OF DELAWARE.

FLAX-MACHINE.

1,134,671.  Specification of Letters Patent.  Patented Apr. 6, 1915.

Application filed December 13, 1906. Serial No. 347,644.

*To all whom it may concern:*

Be it known that I, CLAYTON G. COOKE, a citizen of the United States, residing in the city and county of New Haven, in the State of Connecticut, have invented new and useful Improvements in Flax-Machines, whereof the following, in connection with the accompanying drawings, is a full, clear, and exact description.

The invention relates to machines for continuously and mechanically preparing flax fiber from the straw.

The difficulties in producing a clean fiber from flax straw by a continuous series of mechanical operations are numerous. One obstacle in the way of accomplishing the desired result is the tenacity with which the hard bark of the dry flax straw naturally clings to the inclosed fiber, and the fact that the smaller portions of the bark called shives become entangled in the fiber, even when their natural adherence to it is broken. Consequently, it is difficult to remove them without injuring and wasting the fiber. Another practical difficulty is in manipulating the material automatically by machinery, and this difficulty arises from the fact that after the fiber is partly cleaned, it is difficult to release it from and to carry it to a series of operating devices, because its loose fibers tend to become entangled with the moving parts of the apparatus, and choke the same.

The object of this invention is to overcome these and other difficulties, and to produce by a continuous and automatic series of mechanical operations a commercially clean flax or tow, by means of the several improvements and combinations of parts set forth and claimed hereinafter.

In the accompanying drawings, Figure 1 is a side elevation of a part of the machine, near the feeding end of it.

Like letters of reference indicate similar parts in all the drawings.

Figure 3:
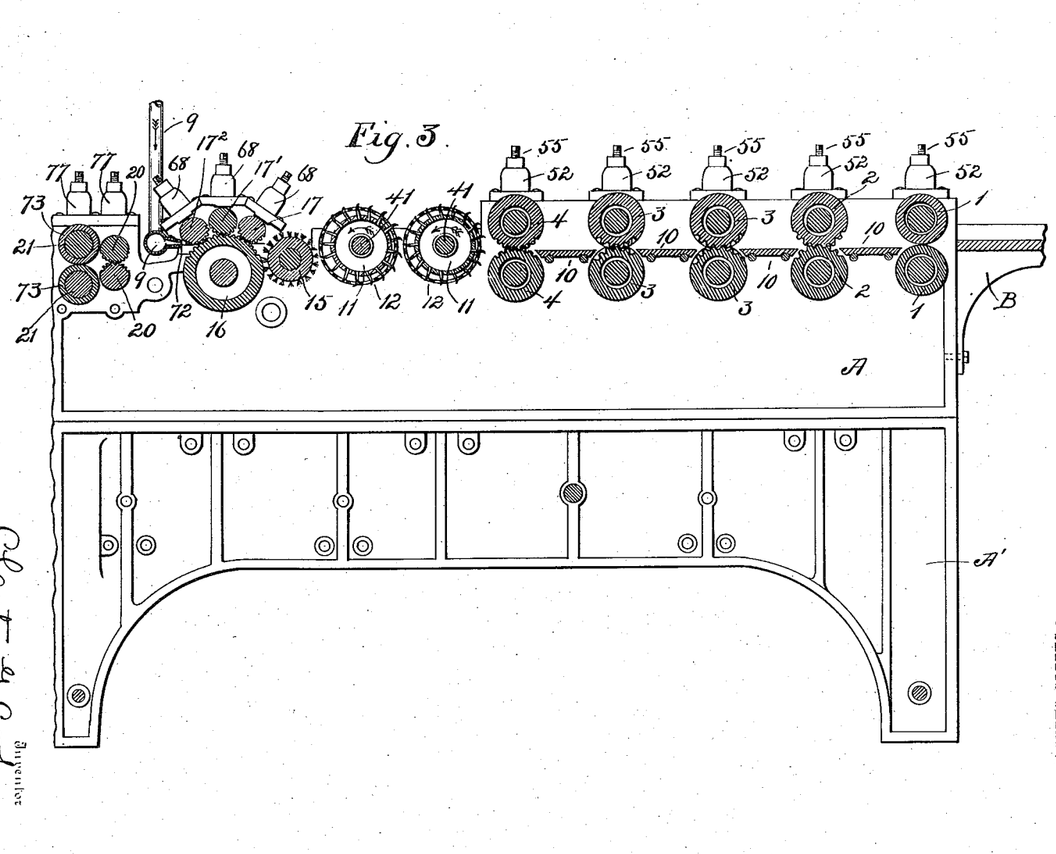
Fig. 3 is a longitudinal vertical section of that portion of the machine illustrated in Fig. 1.

Referring to the drawings for a more particular description, the parts designated by the letters A and A' represent the bed and standard of the machine, and B a portion of the feed tray. Mounted on the bed A, near the feed tray B, is a pair of cylindrical feed rollers 1 (Fig. 3). Near the feed rollers is a pair of straight fluted breaker rolls 2, (Fig. 12) and beyond the breaker rolls are two pairs 3—3 of spirally fluted breaker rolls.

Figures 1, 12A:
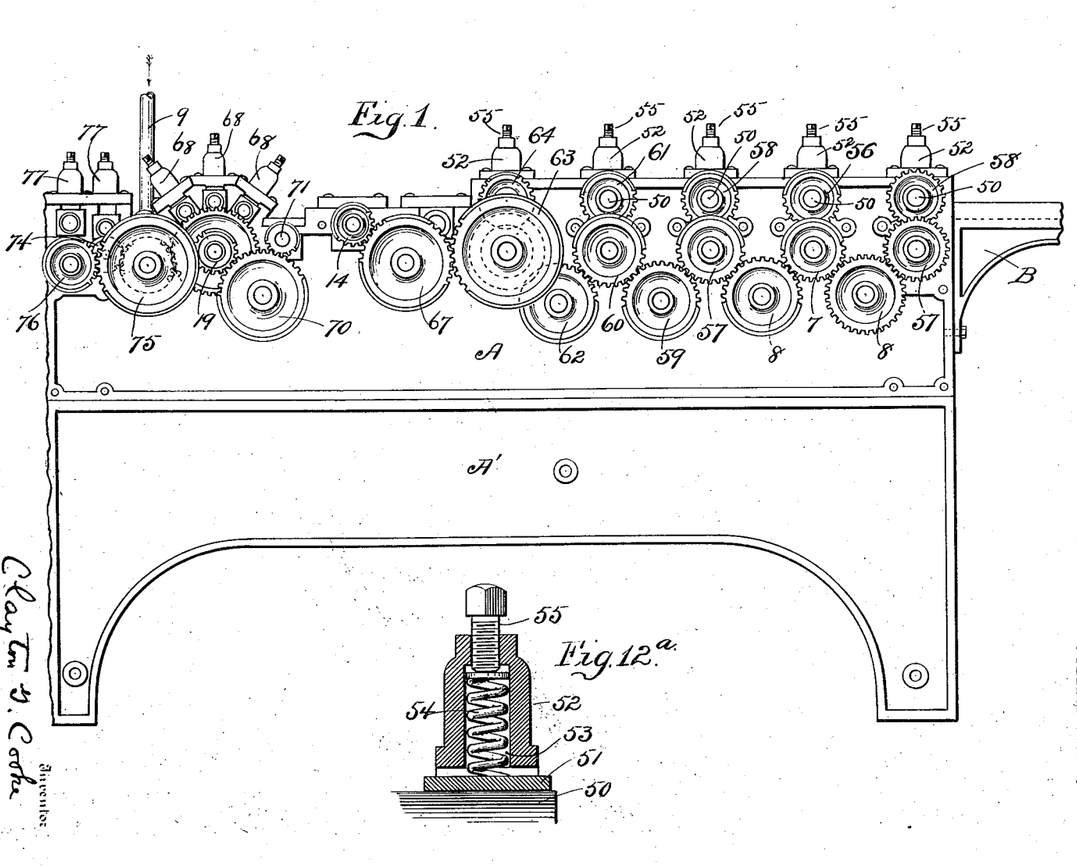

4 designates a supplemental pair of straight fluted breaker rolls, and 10, the tables or trays between the various above named pairs of rolls. The shaft 50 of the upper of each of said pairs of rolls is journaled in a journal box 51, having a vertical sliding movement in a bearing 52, as shown more particularly in Fig. 12$^a$. In the bearing 52 is a vertical socket 53, containing a spring 54, adapted to bear on the upper side of the journal box 51. A screw 55 is provided to vary the tension of the spring 54. By this means, the upper roll of each pair of breaker and feed rolls is capable of a limited movement to allow for the varying thicknesses of straw passing between the rolls and to avoid injury to the machine from hard substances which are sometimes found in the straw.

The rolls 1, 2, 3 and 4 are driven from a vertical shaft 6, by means of a bevel gear 5 (Fig. 5) carried on the shaft of the lower of the pair of rolls 2. As shown in Fig. 1, the shaft of the roll 2 is provided on the other side of the machine with a pinion 7, which meshes with a pinion 56 on the shaft of the upper of the pair of rolls 2. The pinion 7 meshes also with gears 8 adapted to engage pinions 57 on the shafts of the lower rolls of the pairs 1 and 3, which pinions 57 in turn drive pinions 58 on the shafts of the upper of the pairs of rolls 1 and 3. By means of gearing 59 and pinions 60 and 61, the other rolls 3 are rotated. A further gear 62 and pinions 63 and 64 transmit the rotary movement of the shaft 6 to the rollers 4 in similar manner. The vertical shaft 6 is driven from a horizontal shaft 65, which is the main driving shaft of the machine.

Figure 5:
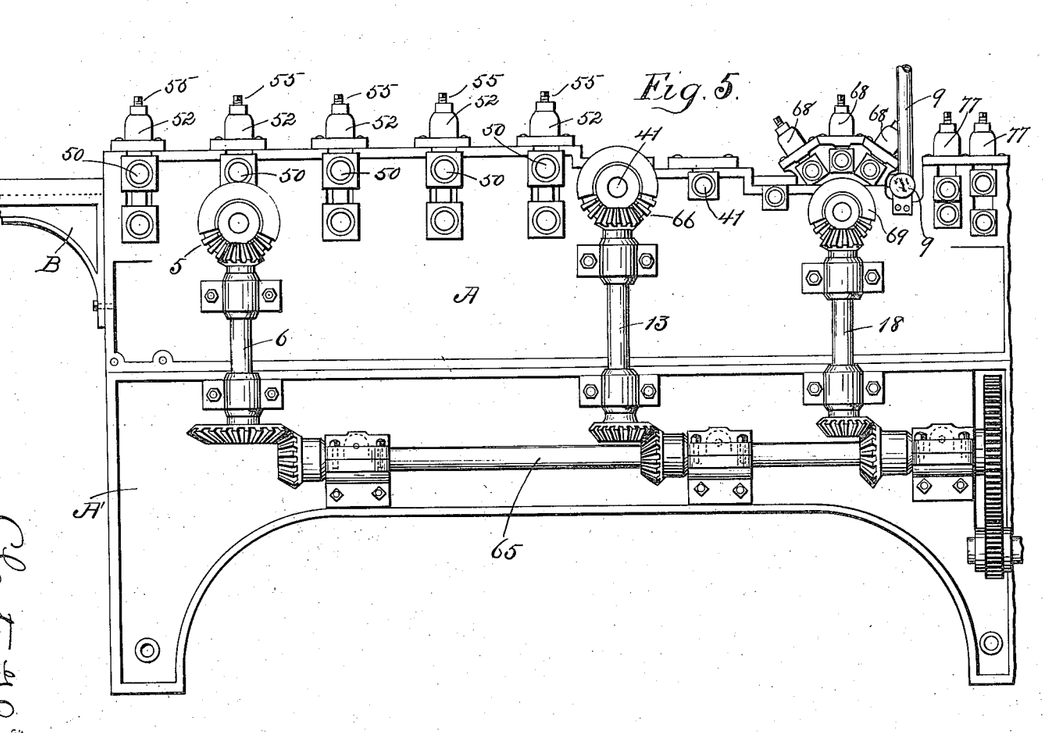
Fig. 5 is a side elevation of the reverse side of the part of the machine shown in Fig. 1.

In Fig. 3 are shown two heckling rolls 11 and stripping cylinders 12, more fully described hereafter. The shaft 41 of the first heckling roll is driven by bevel gearing 66 from the vertical shaft 13, which, as shown in Fig. 5, is driven from the main shaft 65. The shaft 41 of the second heckling roll 11 is provided, as shown in Fig. 1, with a pinion 14, which meshes with a gear 67, driven by the pinion 63 above referred to. The gearing is so arranged that the second heckling roll is driven faster than the first heckling roll. Beyond the second heckling roll 11 and stripping cylinder 12 is located a brush roll 15 and a fine fluted kneading roll 16, which latter roll has three similar kneading rolls 17, 17', 17² (of smaller diameter) engaged therewith, and mounted in spring bearings 68 similar to those above described. The rolls 15 and 16 are driven by a bevel gear 69 on the shaft of roll 16, from vertical shaft 18 operated by the main shaft 65 (Fig. 5). On the opposite end of the shaft of the roll 16 is mounted a pinion 19 (Fig. 1) meshing with a suitable gear 70 driving a pinion 71 on the end of the shaft of roll 15. An air pipe 9 parallel with and in close proximity to the roll 17² has a number of small perforations 72 adapted to direct a downward blast of air on the roll 17². 20 designates another pair of fine fluted kneading rolls (Fig. 3) and 21 a pair of cylindrical gripping rolls, provided with rubber, or other suitable elastic gripping surfaces, 73. The lower of the pair of rolls 20 carries on its shaft a pinion 74, meshing with gear 75, driven by the pinion 19. On the shaft of the lower of the pair of rolls 21 is another pinion 76, also meshing with the gearing 75. The uppermost of the rolls 20 and 21 are carried in spring bearings 77 similar to those described.

Figure 2:
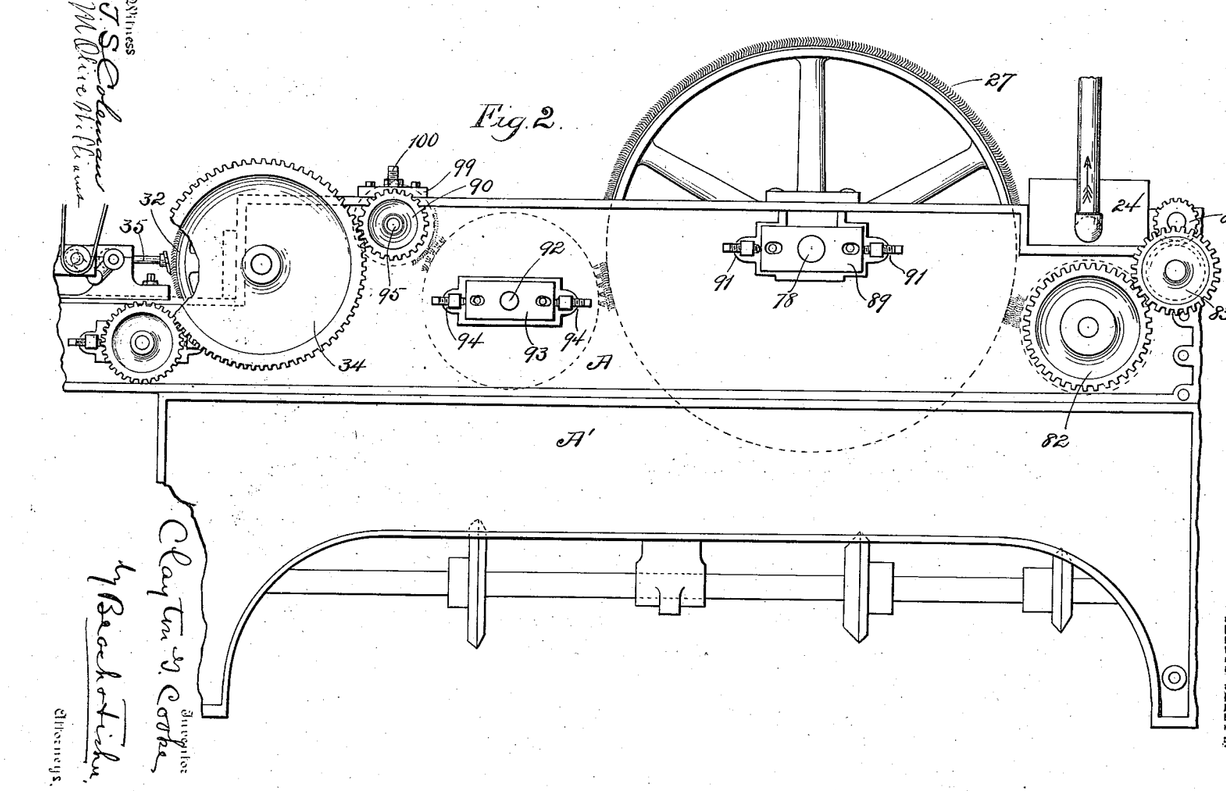
Fig. 2 is a similar side elevation of the rest of the machine, partly broken away.
Figure 4:
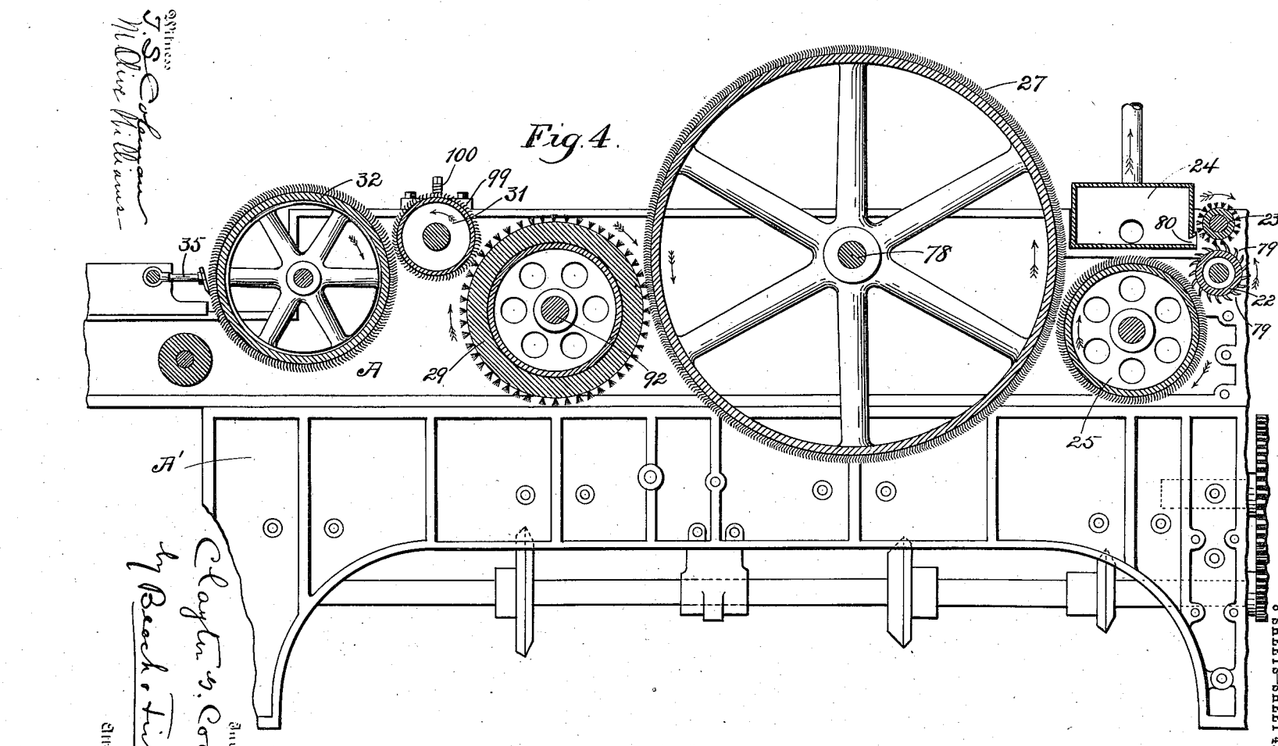
Fig. 4 is a similar section of that portion of the machine illustrated in Fig. 2.
Figure 6:
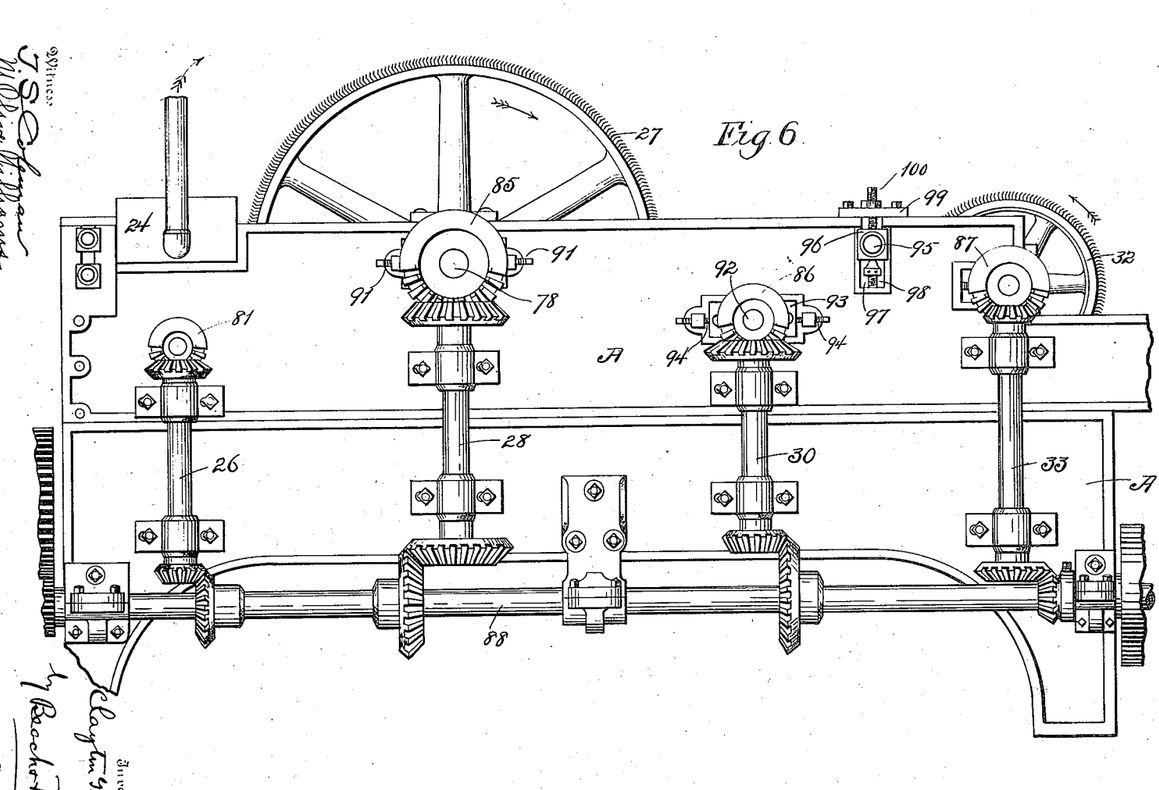
Fig. 6 is a side elevation of the reverse side of the part of the machine shown in Fig. 2.

As shown in Fig. 4, a roll 22 is provided with comb like teeth 79, and a brush roll 23 revolves above and in contact therewith. A suction box 24 is provided with a narrow mouth 80, parallel with and in close proximity with the last named rolls. A carding roll 25 is located beneath the suction box 24, and its shaft is driven from a shaft 26 through the bevel gearing 81 (Fig. 6). On the other side of the shaft of the roll 25 is a pinion 82, meshing with a pinion 83 on the shaft of roll 22. Roll 23 is driven by a pinion 84, meshing with the pinion on the shaft of roll 22 (Fig. 2). 27 designates a large carding roll driven by bevel gearing 85 from shaft 28, and 29 designates a brush or transfer roll driven by bevel gearing 86 from shaft 30. A smaller carding roll 31 revolves in contact with a brush roll 29, and another carding roll 32 revolving in connection with roll 31 is driven by bevel gearing 87 from shaft 33 (Fig. 6). Shafts 26, 28, 30 and 33 are all operated from the main shaft 88. The roll 31 is driven from a pinion 34 on the shaft of roll 32, as shown in Fig. 2, meshing with the pinion 90 on the shaft of roll 31. The shafts of carding rolls 27, 31 and 32, and of the brush roll 29 are shown adjustable in the bed A of the machine. The shaft 78 of the carding roll 27 has bearings in journal boxes 89 which fit in longitudinal slots in the bed, so that the journal boxes and shaft may be moved longitudinally toward or away from roll 25. Screws 91 hold the journal boxes in their adjusted position. The shaft 92 of the brush roll 29 similarly bears in adjustable journal boxes 93 held in place by screws 94, and the shaft 95 of the small carding roll 31 bears in journal boxes 96 slidably mounted in vertical slots 97 in the bed A. Screws 98 hold the boxes in place, and cap plates 99 are secured to the top of the bed over the slots 97 by screws, or other suitable means, and screws 100 pass through them to hold the boxes 96 in their adjusted position. A vibratory doffer comb 35 is shown in contact with the roll 32. The doffer comb 35 is shown driven by a belt 34ᵃ from suitable shafting (not shown), and may be of any well known construction.

Figure 7:
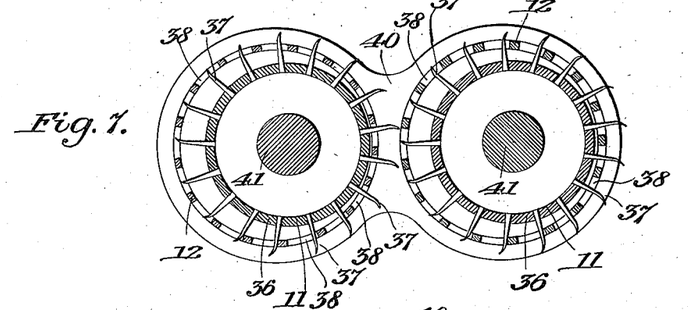
Fig. 7 is a transverse vertical section of the heckling rolls and stripping cylinders.
Figure 8:
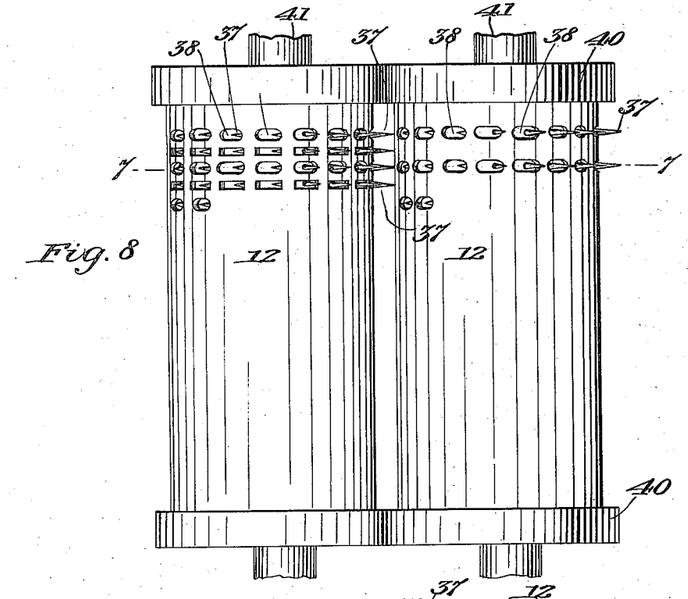
Fig. 8 is a top plan view of the last named parts.
Figure 9:
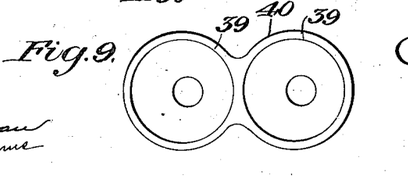
Fig. 9 is an inside elevation of one of the end boxes for the heckling rolls and stripping cylinders.

As shown more particularly in Figs. 7, 8 and 9, the heckling rolls 11 consist of cylinders 36, armed with teeth 37, projecting radially from the cylindrical surfaces of the rolls. The hollow stripping cylinders 12 are provided with elongated apertures 38 corresponding in number and location to the teeth 37 of the heckling rolls 11, respectively. The cylinders 12 are rotatably mounted in circular bearings 39 in the end boxes 40; and said bearings are arranged eccentrically to the shafts 41 of the heckling rolls 11, as shown in Figs. 7 and 9, in such wise that the teeth of the heckling rolls project through the apertures 38 for varying distances, except at and about the major radius of the eccentric, where they are substantially flush with the outside surface of the cylinders 12. It will be understood that the teeth 37 and the corresponding apertures 38 in the cylinders 12 are distributed all over the operating surface of the rolls and cylinder, respectively, although indicated in part only in Fig. 8.

Figures 10, 11, 12:
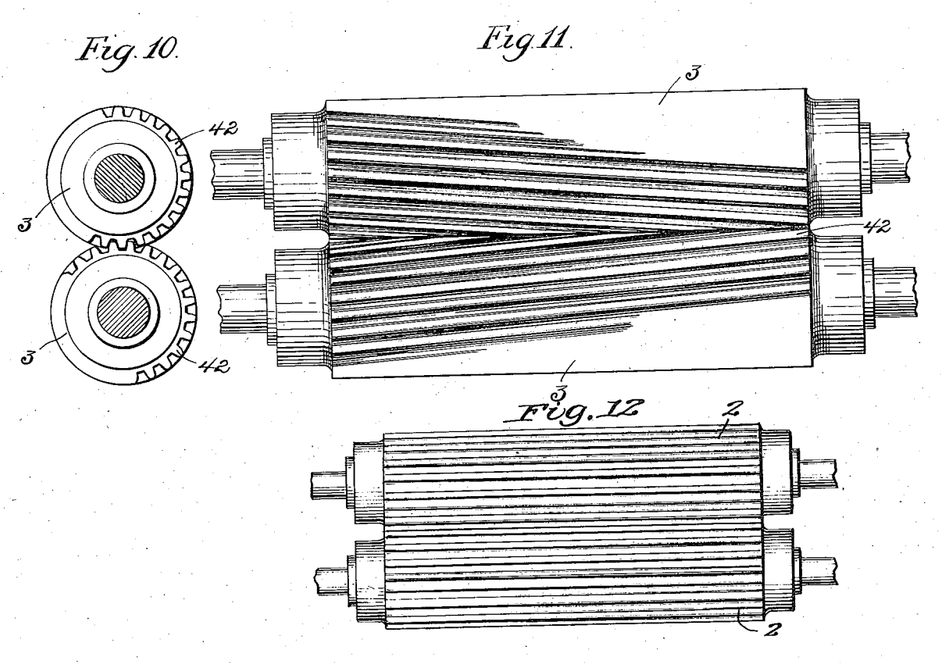
Fig. 10 is a transverse vertical section of one pair of the spiral breaker rolls.
Fig. 11 is an elevation of one pair of said last named rolls.
Fig. 12 is an elevation of one of the pairs of breaker rolls, and Fig. 12$^a$, is a transverse vertical section through one of the spring bearings.

In Figs. 10 and 11, the arrangement of spiral fluting 42 in the rolls 3 is shown, and the manner in which said spiral flutes mesh into each other, and shear across the straws.

The machine comprises several groups of apparatus for performing in succession different operations on the straw and fiber, to wit: first, the operation of breaking the straw which surrounds the fiber, second, the operation of heckling the broken straw to produce a loose mass of partially cleaned fiber, third, the operations of re-cleaning and compacting the fiber into a fleece, which are carried on simultaneously.

*First, the operation of breaking the straw.*—The straw is fed from the feed table B longitudinally, through the pair of smooth feed rollers 1 which push the straw into the first set of fluted breaker rolls 2, whose operation is to crimp or flute the straw, and break the outer bark by bending it sharply, as well as to pass it along to the spirally fluted pairs of breaker rolls 3. Each pair of spirally fluted breaker rolls 3 is composed of one right hand and one left hand spirally fluted roll meshing together, as shown more particularly in Fig. 11, so as to develop a shearing action, which makes it impossible for the flutes of said rolls to mesh into the crimps already formed in the straw by the straight fluted rolls 2, and insures that the straw shall be broken on different lines. The spiral fluted rolls 3 also tend to twist the straw somewhat, and thus increase the effectiveness of the next succeeding set of straight fluted breaker rolls 4. The operation of the spiral breaker rolls 3 tends, in practice, to turn the straw to one side of the machine, and therefore the spiral breaker rolls composing the second set are turned end for end, so that the shearing action moves from right to left on one set and from left to right on the other, partly to bring the straw back again into line, and partly to make sure that the crimping action of the two pairs of rolls will be on new lines and at a different angle. From the second pair of spiral fluted breaker rolls 3, the straw passes through the fourth set of breaker rolls 4, whose flutes are smaller and closer together than those of the other rolls, so that these again crimp and break the bark of the straw on new lines. The object of this arrangement of breaker rolls is that each successive set of breaker rolls shall break the bark of the straw on new lines, and at a different angle from the preceding one. The efficiency of the machine depends largely upon the thoroughness with which the bark of the straw is broken into small pieces upon numerous lines of fracture. Some of the pieces of the bark fall off in this operation of breaking, and others cling to the fibers. It is important that precaution should be taken against injuring the interior fiber by straining or breaking it during the operation of crimping the straw; this is provided for through the system of gearing already described, which is so constructed that each successive set of the breaker rolls is driven at slightly less surface speed than the one which precedes it in point of operation.

*Second, the operation of heckling the straw.*—The cortex of the straw being thoroughly broken, and the broken pieces worked loose from the fiber by the successive operations of the flutes; the material is now taken directly from the rolls 4 by the projecting teeth of the first heckling roll 11. The second heckling roll 11 rotates faster than the first roll, which is driven at a higher rate of surface speed than the rolls 4. By this means, the teeth 37 pass between the fibers of the material and comb through them like a heckle, and at the same time, carry the fibers along as fast as the rolls 4 will permit them to come through. In this operation, the fiber is loosened up, and the material loses all the stiffness and individuality of the straws, and exhibits a tendency to tangle in the moving parts of the machine. Some positive stripping device is required to prevent the loose fibers from winding themselves up on the heckling rolls, and this is supplied by the perforated cylinders 12 rotatably mounted in circular bearings, eccentric to the shafts of the heckling rolls 11. The cylinders are caused to rotate by the teeth 37 of the heckling rolls, projecting through the apertures 38 in the cylinders, and the conjoint effect of the cylinders and rolls is that as the teeth 37 of the first roll 11 approach the teeth of the second heckling roll 11, the former are gradually drawn in through the apertures 38 of the cylinder 12 until their points, which are preferably bent back, as shown in Fig. 7, are flush with the surface of the cylinder. In this way, the cylinder 12 operates to strip the loose mass of fiber off from the teeth of roll 11, and leaves it free to be caught up by the projecting teeth of the next roll 11, which operates in the same way, being driven at a higher surface speed, so that its teeth heckle and comb through the fiber, until they approach the brush or transfer roll 15, when the stripping cylinder 12 of the second heckling roll 11 strips the fiber from the teeth of the roll and leaves it free to be caught up by the brush roll 15, to be operated on by the next succeeding devices. The operation of these heckling rolls is to remove the shives or fragments of straw bark, except those pieces which are so small and so thoroughly entangled in the fiber as to escape their operation. They also tend to straighten out the fiber and bring it into the condition of a loose mass, which is very difficult to handle, and requires to be conveyed to the kneading rolls by some device which will support and positively direct the loose mass of fiber. The brush or transfer roll 15 is devised for this purpose, and it runs close against the second stripping cylinder 12 at a slightly higher surface speed, and by reason of its rough surface and higher speed carries the material over to the kneading roll 16, which itself runs at a higher rate of speed than the brush or transfer roll, and being in contact therewith takes the fiber off from the brush. Moreover, the rotation of the main kneading or gripping roll 16 (and its associated smaller rolls 17, 17', 17²) at a higher speed than the second heckling roll 11 materially increases the heckling effect, inasmuch as the fibers engaged by the gripping rolls and floating on the rotary transfer brush 13 will be forcibly pulled through the more slowly rotating teeth of the second heckling roll. The heckling effect is still further augmented by the rotation of the different heckling devices at different speeds, because fiber carried by the teeth of one device will be scratched through or heckled by the teeth of the other device.

*Third, the operation of compacting the fiber into a fleece and cleaning it from fine and tangled shives.*—This operation is begun in the kneading rolls 16, 17, 17', 17². These kneading rolls are straight fluted rolls of much finer mesh than the breaker rolls, and they knead out to the surface the entangled shives, and in some degree compact the fiber into a fleece. As the fleece issues from the system of kneading rolls, the free ends of its loose fiber still tend to wind themselves up on the roll 17², and in part to prevent this, and in part to winnow away loose fragments of shives, the fleece is subjected to a downward blast of air directed against the roll 17² from the apertures in pipe 9, which is connected with a suitable source of compressed air for that purpose (not shown).

For the purposes described, I do not limit myself to the use of an air blast in connection with the roll 17², as the same may be used in connection with other moving parts to prevent the loose fiber from becoming entangled therein, and to direct said fibers into the desired path. From the kneading rolls 16 and 17², the fleece passes through another set of fine fluted rolls 20, which are driven at a less surface speed and further compact it, and thence between the rubber faced gripping rolls 21. As the elastic compacting rolls are in substantial contact with the corresponding fine fluted kneading rolls and as said compacting rolls rotate in the same direction as the corresponding kneading rolls the stock is prevented from winding about the kneading rolls. As it issues from the compacting rolls it is subjected to the combined operation of the combing roll 22 and brush roll 23, revolving in opposite directions so that their adjacent peripheries travel in the same direction, in overlapping contact with each other, and driven at a higher surface speed than the gripping rolls 21, so that they comb and brush though the fleece, as it is held by the gripping rolls for that purpose, straightening it and cleaning out the fine fragments of shives which are drawn into the suction box 24 to prevent them from falling back on the fleece, and becoming again entangled therein, during the subsequent carding operations. The brush roll 23 rotates at a slightly greater surface speed than the combing roll 22 and the combined operation of the comb and brush rolls 22 and 23 is not only to clean and straighten the fiber, but while doing so, the brush roll 23, which revolves at about the same surface speed as the comb roll 22, brushes the fleece compactly on the comb roll and leaves it in the proper condition for carding. The fleece is carried by the comb roll 22 and carded off on the carding roll 25, which revolves at a higher rate of surface speed than roll 22, and from roll 25 it is carried to and carded off on the carding roll 27, revolving at a still higher rate of surface speed. In order to take the fleece off from the comb roll and prevent it from winding up thereon, the roll 25, is provided with carding cloth having long and elastic teeth. It will be observed that after leaving the breaker rolls 4, the material is subjected to a practically continuous drawing operation, passing over or between rotating surfaces having successively faster surface motion up to and including carding roll 27. It is now desirable to transfer the fleece to carding rolls of less peripheral speed before taking it off from the machine; and a second brush or transfer roll 29 moving in the same direction at the point of peripheral contact with carding roll 27, and at substantially the same or greater rate of surface speed is provided for that purpose, which takes the fleece from carding roll 27. The next succeeding roll 31 is provided with carding cloth, the teeth of which incline backward as it rotates in the direction of the arrow (See Fig. 4), and as it has a comparatively slower surface speed than the brush roll 29, the fiber is caught by the teeth of the carding roll at the point of contact of the two rolls. From carding roll 31 it is in turn carded off on to the carding roll 32, which has a comparatively slower surface speed than carding roll 31, and has the teeth of its carding cloth also inclined backward (Fig. 4). The two rolls 31 and 32 move in the same direction at the point of peripheral contact and the fiber on the roll 31 is caught by the more slowly moving teeth of the carding roll 32 and drawn off the backwardly projecting teeth of the carding roll 31. The flax then removed from the machine by the doffer comb 35, operating in the manner usual in cotton machinery.

From the foregoing description it will be apparent that the new result obtained by the machine may be thus characterized: Continuous conveyance of an uninterrupted web of fibrous material, preliminary mechanical disintegration of the woody portion or shive by successive corrugations of the web, avoidance in the meantime of rupturing tension on the fiber, succeeding acceleration of the velocity of the web accompanied by removal of the disintegrated shive, succeeding further disintegration by mechanical means, of remaining shive, subsequent mechanical removal of residual shive followed by further acceleration of the speed of the web with accompanying separation of fiber, retardation of the speed of the web and final collection of the cleaned fiber. In order to produce this result means are provided to conduct the web or band of material continuously through the several stages of cleaning; the band of material is first introduced to means for breaking the shive component of the material; means are provided to sustain the fibrous component of the material free from tension during the operation of the shive breaking means; means are provided, succeeding the breaking means in operation on the material, to accelerate the advance of the band or web and draw out the fibrous component thereof; and during the drawing operation just mentioned the previously broken shive is eliminated from the fiber, the band or web being suitably supported during its drawing, after which the speed of the web is retarded, and the cleaned fiber finally collected.

Having now described my invention, what I claim and desire to secure by Letters Patent, is:—

1. In a flax machine, the combination with a plurality of pairs of spirally fluted breaker rolls, the flutes of the succeeding pair being arranged at a different angle from the flutes of the preceding pair, and the succeeding pair having a relatively less surface speed than the preceding pair; of means acting upon the broken straw to separate the shives from the fiber, and driving mechanism for rotating said rolls continuously in one direction, substantially as and for the purposes described.

2. In a flax machine, the combination with a pair of spirally fluted breaker rolls; of a succeeding pair of straight fluted breaker rolls; and a heckling roll adapted to act upon the flax after said straight fluted breaker rolls, substantially as and for the purposes described.

3. In a flax machine, the combination with a pair of straight fluted breaker rolls; of an auxiliary pair of straight fluted breaker rolls; and two pairs of spirally fluted breaker rolls arranged between said straight fluted breaker rolls, the flutes of one pair of spirally fluted rolls being arranged at a different angle from the flutes of the other pair, all arranged so that the material will be successively acted upon in a continuous movement from one part to the other, substantially as and for the purposes described.

4. In a flax machine, the combination with breaking rolls; of heckling devices, adjacent to and operating at a greater speed than said breaking rolls, for heckling the straw held by said rolls, means for stripping the heckled fiber from the teeth of said heckling devices; means for removing the heckled fiber from said stripping devices comprising a roll having a roughened surface, substantially as and for the purposes described.

5. In a flax machine, the combination with a pair of fluted breaker rolls; of a heckling device; means for stripping the heckled fiber from the teeth thereof; a second pair of rolls and a brush roll arranged in close association with said stripping device for carrying the fiber from the latter to said second pair of rolls, substantially as and for the purposes described.

6. In a flax machine, the combination with means for breaking the straw, and means for heckling the broken straw, of means for stripping the fiber from the heckling means, and a rotary transfer brush in close proximity to said stripping means for removing the heckled fiber from the latter and advancing the same in the direction of feed; substantially as described.

7. In a flax machine, the combination with a pair of fluted breaker rolls, of a pair of fluted rolls preceding said breaker rolls, to feed the straw to the latter at a speed greater than the peripheral speed of said breaker rolls, and a heckling device to engage the fiber of the straw as it emerges from said breaker rolls; substantially as described.

8. In a flax machine, the combination with a pair of breaker rolls, of a pair of rolls preceding said breaker rolls, to feed the straw to the latter at a speed greater than the peripheral speed of said breaker rolls, and heckling means to engage the fiber of the straw as it emerges from said breaker rolls, operating at a speed greater than the peripheral speed of said breaker rolls; substantially as described.

9. In a flax machine, the combination with a pair of breaker rolls having projections thereon constructed to grip and bend the straw; of a pair of rolls preceding said breaker rolls adapted to feed the straw to said breaker rolls at a speed greater than the peripheral speed of said rolls, and toothed rolls adapted to engage the fiber of the straw as it emerges from the breaker-rolls, traveling at a greater peripheral speed than said breaker rolls, substantially as and for the purposes described.

10. In a flax machine, the combination with a plurality of breaker rolls for continuously breaking the straw upon successive different lines; of heckling rolls provided with means for continuously stripping the fiber from the teeth thereof; devices for compacting the heckled fiber into a fleece; and means intermediate between said heckling and compacting devices for transferring the heckled fiber from the former to the latter, substantially as and for the purposes described.

11. In a flax machine, the combination with breaker rolls and heckling devices, and a pair of gripping rolls; of a comb roll and a brush roll, arranged parallel with said gripping rolls and near the delivery side thereof, said comb and brush rolls mounted in overlapping peripheral contact with each other, substantially as and for the purposes described.

12. In a flax machine, the combination with heckling means and stripping means, of movable brushing means for brushing the heckled fiber from said stripping means, said brushing means supporting the fiber from beneath and operating at a greater speed than said heckling means; substantially as described.

13. In a flax machine, the combination with heckling means and kneading means following the heckling means, of means for brushing and thereby cleaning the heckled fiber issuing from said heckling means, and for simultaneously advancing such fiber from said heckling means to said kneading means; substantially as described.

14. In a flax machine, the combination with breaker devices; of heckling devices; combing devices; carding devices, and associated means whereby the fiber is supported from beneath throughout its travel from one to the other of said devices and maintained in constant movement, substantially as and for the purposes described.

15. In a flax machine, the combination with heckling instrumentality; of combing and brushing rolls; a series of carding rolls; means for stripping the material from the last of said carding rolls; and associated means whereby the fiber is continuously supported from beneath throughout its travel from said combing and brushing rolls to said stripping means and maintained in constant movement, substantially as and for the purposes described.

16. In a flax machine, the combination with heckling means, and a pair of rolls following said heckling means, of a rotary device interposed between said heckling means and said rolls and arranged to support the fiber from beneath substantially throughout the distance between said heckling means and said rolls, and to feed the fiber into the bite of said rolls; substantially as described.

17. In a flax machine, the combination with breaking rolls; of heckling devices operating upon the broken straw as it emerges from said breaker rolls; kneading rolls; two carding rolls revolving at different peripheral speeds; a transverse roll having a brush-like surface arranged intermediate said carding rolls and revolving in contact therewith, all operatively associated together and so arranged that the material will be successively acted upon in a continuous movement through the machine, substantially as and for the purposes described.

18. In a flax machine, the combination with a plurality of breaker rolls adapted to break and bend the straw, the succeeding rolls operating at decreasing speeds; of heckling instrumentality adapted to receive the fiber from said breaker rolls, the heckling instrumentality operating at a greater speed than the adjacent breaker rolls; compacting rolls operating at a still greater speed than the heckling instrumentality; a plurality of carding rolls operating at successively decreasing speeds; and means interposed between the heckling instrumentality and the compacting rolls, and between the compacting rolls and the carding rolls for supporting the material from one to the other of the said parts, and maintaining a continuous feed, substantially as and for the purposes described.

19. In a flax machine, the combination of means to conduct continuously a band or web of the material through the several stages of cleaning, means to which the band of material is first introduced to break the shive components of the material, means to sustain the fibrous component free from tension during the operation of said shive-breaking-means, means succeeding said breaking-means in operation on the material, to accelerate the advance of the band or web and draw out the fibrous component thereof, and means to eliminate the previously broken shive from the fiber during the drawing; substantially as described.

20. In a flax machine, the combination with heckling means, and a pair of rolls following said heckling means, of a movable transfer device interposed between said heckling means and said rolls and arranged to support the fiber from beneath substantially throughout the distance between said heckling means and said rolls, and to feed the fiber into the bite of said rolls, said rolls operating at a higher speed than said heckling means, and said transfer device operating at a lower speed than said rolls; substantially as described.

21. In a flax machine, the combination with a series of preliminary fluted breaker rolls; of supplementary fluted breaker rolls; a heckling roll adapted to engage the flax from the under side after it comes from the preliminary breaker rolls; and means for transferring it from the heckling roll to the supplementary breaking rolls, substantially as and for the purposes described.

22. In a flax machine, the combination of heckling means, movable means for stripping the fiber from said heckling means, a pair of rolls spaced horizontally from said heckling means and following the latter, and a transfer device interposed between said stripping means and said rolls and in close proximity to said means and said rolls, adapted to support the fiber from beneath and carry it in an approximately horizontal direction from said stripping means into the bite of said rolls; substantially as described.

23. In a flax machine, the combination with means for preparing the flax straw for combing and other subsequent treatment consisting of a plurality of pairs of rolls having projections thereon constructed to bend and break the straw as it passes between the rolls of each pair to loosen the shives from the fiber, each succeeding pair of rolls having a relatively less peripheral speed than the preceding pair to prevent the straining of the fiber; and heckling instrumentality acting upon the straw as it emerges from the last pair of breaker rolls to separate the shives from the fiber, substantially as and for the purposes described.

24. In a flax machine, the combination with means for breaking the straw, of means to heckle the broken straw, means to knead the heckled fiber, means to clean and compact the kneaded fiber, means to card the cleaned fiber, means to support the fiber from beneath and advance it from the heckling means to the kneading means, and means to support the fiber from beneath and advance it from the kneading means to the compacting and cleaning means, the carding means receiving the fiber directly from the compacting and cleaning means; substantially as described.

25. In a flax machine, the combination with a heckling device; of a compacting device; a carding device; and instrumentalities interposed between each of said devices acting to support the fiber and maintain a continuity of movement between the devices, substantially as and for the purposes described.

26. In a flax machine, the combination with a bearing; of a cylinder loosely mounted therein having slots elongated in the plane of revolution; a rotary member mounted eccentrically within said cylinder; teeth rigidly mounted on said rotary member projecting through said slots on the minor axis of the eccentric and actuating said cylinder upon the rotation of said member; and means for rotating said member, substantially as and for the purposes described.

27. In a flax machine, the combination with a bearing; of a cylinder loosely mounted therein having slots elongated in the plane of revolution; a shaft eccentrically mounted within said bearing; a rotary member mounted thereon; teeth rigidly mounted on said rotary member projecting through said slots upon the minor axis of the eccentric and actuating said cylinder upon the rotation of said member; and means for rotating said shaft, substantially as and for the purposes described.

28. In a flax machine, the combination with a plurality of fluted breaker rolls; of a device for heckling the broken straw as it emerges from said breaker rolls; rotary means for stripping the heckled fiber from the teeth of the heckling device; and supplementary fluted breaker rolls operating on the fiber after it is stripped from the heckling device, substantially as and for the purposes described.

29. In a flax machine, the combination with oppositely disposed supports, each having a plurality of circular flanges; cylinders loosely mounted within said flanges; rotary members eccentrically mounted within said cylinders; and teeth mounted on said rotary members and adapted to project through apertures in said cylinders, substantially as and for the purposes described.

30. In a flax machine, the combination with a pair of breaker rolls having straight flutes thereon constructed to grip and bend the straw; of a pair of breaker rolls having spiral flutes thereon preceding said straight fluted breaker rolls adapted to feed the straw to said straight breaker rolls at a speed greater than the peripheral speed of said straight breaker rolls; and rolls adapted to remove the shives from the fiber as it emerges from the straight breaker rolls, traveling at a greater peripheral speed than said breaker rolls, substantially as and for the purposes described.

31. In a flax machine, the combination of means to break the straw, means to heckle the broken straw, means to brush the heckled fiber and simultaneously advance the same, and a supplementary breaking means which receives the fiber directly from said last named means; substantially as described.

32. In a flax machine, the combination with a device for heckling the straw; of fluted kneading rolls following said heckling device; and a brush between said heckling device and kneading rolls for brushing the fiber and supporting it from said heckling device to said kneading rolls, substantially as and for the purposes described.

33. In a flax machine, the combination with a device for heckling the straw; of fluted breaker rolls; and a transfer brush arranged between said heckling device and breaker rolls, said transfer brush operating at a greater speed than said heckling device and less speed than said breaker rolls, substantially as and for the purposes described.

34. In a flax machine, the combination with a device for heckling the straw; of means for stripping the heckled straw from said heckling device; breaker rolls; and a transfer roll arranged between said stripping device and breaker rolls and in close association with both, substantially as and for the purposes described.

35. In a flax machine, the combination with a support; of a driving shaft mounted on said support; a device for heckling the straw; fluted breaker rolls; a transfer roll arranged between said heckling device and breaker rolls to convey the heckled straw from said device to said rolls, all mounted on said support and driven by said shaft to effect a continuous movement of the material through the machine, substantially as and for the purposes described.

36. In a flax machine, the combination with heckling instrumentality; of feed rolls; devices arranged in operative relation with said feed rolls for simultaneously combing and brushing the material while held by said feed rolls; and means for causing a current of air to act upon the material while being combed and brushed, substantially as and for the purposes described.

37. In a flax machine, the combination with heckling instrumentality; of feed rolls; devices arranged in operative relation to said feed rolls for simultaneously combing and brushing the material while held by said feed rolls; and a suction chamber having an inlet arranged at a point between the brushing and combing devices, substantially as and for the purposes described.

38. In a flax machine, the combination with heckling instrumentality; of feed rolls; combing and brushing rolls operatively associated and arranged to receive the material from said feed rolls; and a carding roll, the combing and brushing rolls revolving at a greater speed than said feed rolls, and said carding roll revolving at a greater speed than said combing and brushing rolls; all of said rolls being in close relation and so arranged that the material will be continuously supported by a roll in its movement, substantially as and for the purposes described.

39. In a flax machine, the combination with means to heckle the straw, of means for breaking or kneading the heckled straw, a compacting device following said last named means, and a pair of fluted rolls interposed between said breaking or kneading means and said compacting device; substantially as described.

40. In a flax machine, the combination with breaking, heckling, kneading and carding rolls operating at successively greater speeds; of a transfer roll; and an auxiliary carding roll, the transfer roll operating at a greater surface speed than the auxiliary carding roll, substantially as and for the purposes described.

41. In a flax machine, the combination with heckling instrumentality; of kneading rolls; cleaning devices; a carding roll; an auxiliary carding roll; and a transfer roll having a roughened surface arranged to contact with both of said carding rolls; all operatively associated together and so arranged that the material will be successively acted upon in a continuous movement through the machine, substantially as and for the purposes described.

42. In a flax machine, the combination with heckling instrumentality; of a kneading roll; a relatively small kneading roll meshing with said first mentioned roll; means for transferring the material from the heckling instrumentality to said kneading rolls; and an air pipe parallel with and in proximity to said small kneading roll arranged to direct a downward current of air on said roll, substantially as and for the purposes described.

43. In a flax machine, the combination with mechanism for separating the shives from the fiber; of a plurality of carding rolls; the succeeding roll operating at a lower speed than the preceding roll and a transfer brush between said carding rolls operating at a greater surface speed than the succeeding carding roll, substantially as and for the purposes described.

44. In a flax machine, the combination with heckling means, of spaced carding rolls with their teeth inclined in opposite direction, means for driving said carding rolls in the same direction, a rotary transfer brush arranged between and in contact with both of said carding rolls, and means to drive said brush in a direction opposite to the direction of rotation of said carding rolls; substantially as described.

45. In a flax machine, the combination with means for heckling the straw, of movable means for stripping the fiber from said heckling means, a pair of kneading rolls following said stripping means, a transfer device interposed between said stripping means and said kneading means and arranged to carry the fiber from said stripping means into the bite of said rolls, means for compacting the fiber issuing from said kneading rolls, and a pair of rolls in close proximity to said compacting means and interposed between the latter and said kneading rolls; substantially as described.

46. In a flax machine, the combination with a pair of spirally fluted breaking rolls, and a heckling device following said breaking rolls, of a pair of straight fluted breaking rolls interposed between said spirally fluted breaking rolls and said heckling device; substantially as described.

47. In a flax machine, the combination with a pair of spirally fluted breaking rolls and a heckling device following said breaking rolls, of a pair of straight fluted breaking rolls interposed between said spirally fluted rolls and heckling device, and operating at a lower speed than said spirally fluted rolls and said heckling device; substantially as described.

48. In a flax machine, the combination of a pair of straight fluted breaking rolls, a heckling device adapted to act on the straw emerging from said breaking rolls, and a plurality of spirally fluted breaking rolls which act on the fiber prior to said straight fluted rolls, said breaking rolls operating at successively decreasing speeds in the direction of feed; substantially as described.

49. In a flax machine, the combination with heckling instrumentality; of means for stripping the heckled straw from said heckling device; kneading rolls; a transfer roll arranged to transfer the fiber after it is stripped from the heckling instrumentality to said kneading rolls; and means for cleaning the fiber after it comes from said kneading rolls, substantially as and for the purposes described.

50. In a flax machine, the combination with heckling instrumentality; of kneading rolls; a rapidly rotating carding roll; an auxiliary carding roll rotating at a less surface speed than the first mentioned carding roll and having its teeth inclined backward; and a brush roll arranged in contact with both carding rolls and having a greater surface speed than said auxiliary carding roll, substantially as and for the purposes described.

51. In a flax machine, the combination with breaker rolls and heckling devices, and a pair of gripping rolls; of a comb and a brush roll arranged parallel with said gripping rolls and mounted in overlapping peripheral contact with each other to act on opposite sides of the same portion of the fiber; and carding rolls adapted to receive the material from said comb and brush rolls, substantially as and for the purposes described.

52. In a flax machine, the combination with heckling instrumentality; of breaker rolls; a combing roll arranged adjacent to and adapted to receive the material from the breaker rolls, and means for brushing that portion of the fiber being combed, substantially as and for the purposes described.

53. In a flax machine, the combination with heckling instrumentality; of a brushing device and a combing device arranged oppositely and in close proximity to one another and adapted to simultaneously act upon the same portion of fiber from opposite sides, substantially as and for the purposes described.

54. In a flax machine, the combination with heckling and kneading devices respectively; of carding rolls; and means interposed between the heckler and carding rolls, including a brush roll and a comb roll, one of said rolls constituting a support for the material while acted upon by the other, substantially as and for the purposes described.

55. In a flax machine, the combination with heckling and kneading devices respectively; rolls having projections thereon adapted to grip the flax; and a pair of compacting rolls rotating in close proximity to said first mentioned rolls to receive the flax therefrom, substantially as and for the purposes described.

56. In a flax machine, the combination with heckling instrumentality; rolls having projections thereon adapted to grip the flax; a pair of rolls rotating in close proximity to said first mentioned rolls to receive the flax therefrom and yieldingly grip the same, substantially as and for the purposes described.

57. In a flax machine, the combination of a pair of kneading rolls, and a pair of elastic gripping rolls, said gripping rolls being rotatable in the same direction as the corresponding kneading rolls, and in substantial contact with the latter; substantially as described.

58. In a flax machine, the combination of a pair of fine fluted kneading rolls and a pair of rubber coated compacting rolls following said kneading rolls, but in substantial contact with the same to prevent the winding of the stock about said kneading rolls; substantially as described.

59. In a flax machine, the combination of means to break the straw along a plurality of different lines without subjecting the fiber to tension, means for extending or drawing the web, means for clearing the web of the shives, and collecting the cleaned fiber, and means to support the web in a continuous motion through the machine; substantially as described.

60. In a flax machine, the combination of means to break the straw, gripping means following the breaking means, separate heckling devices successively arranged in the direction of feed and interposed between said breaking means and said gripping means, and a transfer device interposed between the last heckling device and said gripping means, the last heckling device operating at a higher speed than the first; substantially as described.

61. In a flax machine, the combination of means to break the straw, gripping means following said breaking means, a plurality of heckling devices successively arranged in the direction of feed and interposed between said breaking means and said gripping means, and a movable transfer device interposed between the last heckling device and said gripping means, the last heckling device operating at a higher speed than the first, but at a lower speed than said gripping means, and said transfer device operating at a lower speed than said gripping means; substantially as described.

62. In a flax machine, the combination of a heckling device, gripping means traveling at a greater rate of speed, succeeding said heckling device, and an intermediate carrying device for supporting the flax from beneath and transferring it from the heckling device to said gripping means without tearing or pulling the flax; substantially as described.

63. In a flax machine, the combination with a rotary heckling roll of a rotary device for stripping the fiber from said roll and means for simultaneously brushing the fiber stripped from the heckling means and advancing the fiber in the direction of feed; substantially as described.

64. In a flax machine, the combination with heckling means and gripping means, of a movable stripper for stripping the fiber from said heckling means, and a rotary transfer brush for brushing and supporting the fiber stripped from said heckling means and transferring such fiber to said gripping means; substantially as described.

In witness whereof, I have hereunto set my hand on the 12th day of December, 1906.

CLAYTON G. COOKE.

Witnesses:
M. OLIVE WILLIAMS,
SAMUEL H. FISHER.